May 27, 1952 A. J. BENT 2,597,917
FLUID PRESSURE BRAKE CYLINDER DEVICE
Filed July 31, 1947
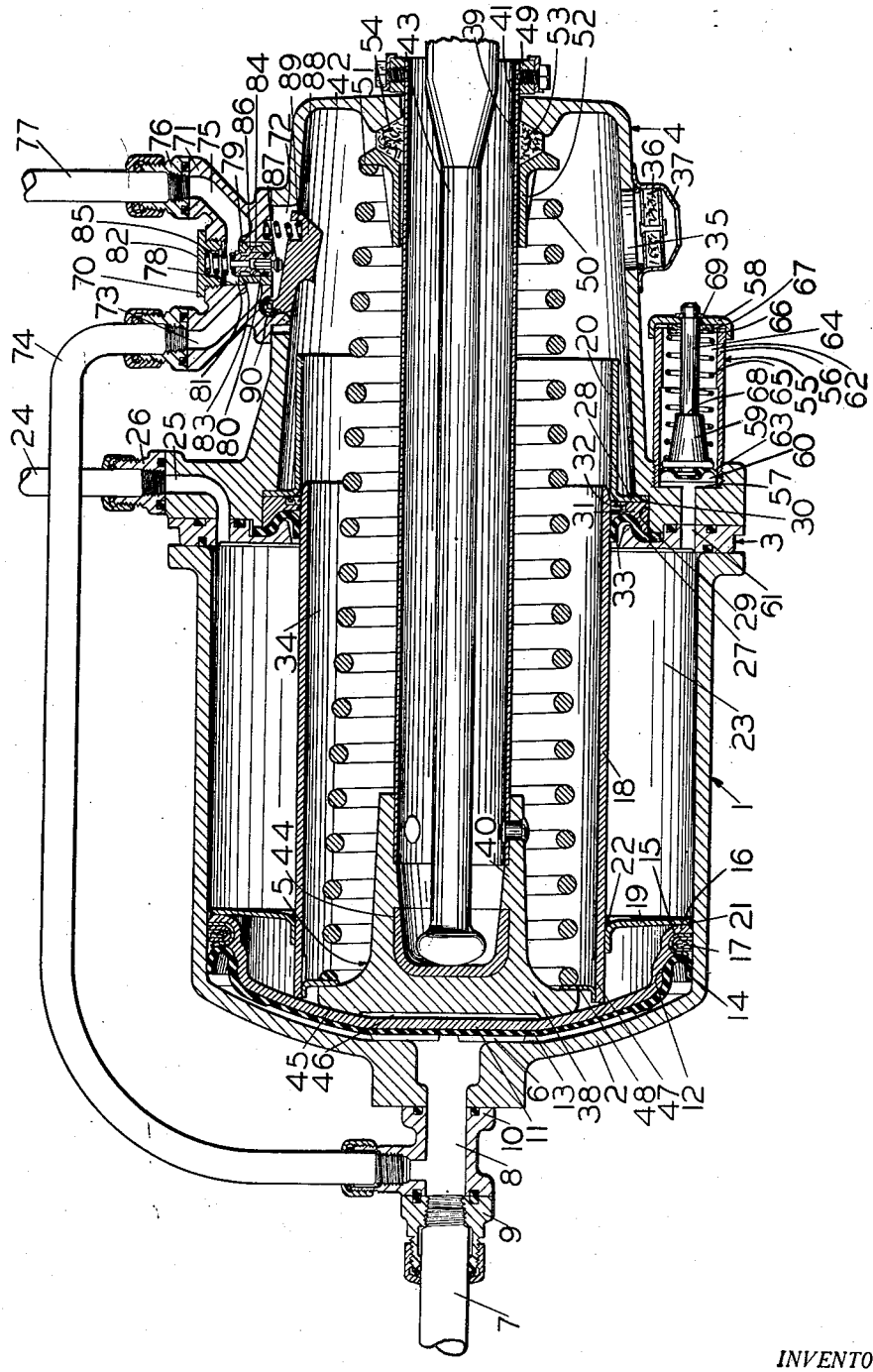
INVENTOR.
ARTHUR J. BENT
BY Frank E. Miller
his ATTORNEY Patented May 27, 1952

2,597,917

UNITED STATES PATENT OFFICE 2,597,917

FLUID PRESSURE BRAKE CYLINDER DEVICE

Arthur J. Bent, Penn Township, Allegheny County, Pa., assignor to Westinghouse Air Brake Company, a corporation of Pennsylvania Application July 31, 1947, Serial No. 764,941

2 Claims. (Cl. 121—38)

This invention relates to fluid pressure brake cylinder devices and more particularly to brake cylinder devices adapted for use in variable load brake equipment of the type disclosed in United States Patent No. 2,482,246, issued on September 20, 1949, to Earle S. Cook, et al. and assigned to the assignee of the present invention.

In the aforementioned application there is disclosed and described an improved variable load brake equipment which is adapted to automatically vary the degree of braking of a vehicle in accordance with the degree of loading thereof. The improved equipment comprises a brake cylinder device embodying a piston adapted to be operatively connected to the usual brake rigging and arranged to be actuated for applying force to the brake shoe or shoes by action of pressure of fluid in the usual pressure chamber at one side of said piston, as controlled by the well-known AB valve, against opposition of action of pressure of fluid in a compensating chamber at its opposite side, which latter pressure is varied upon supply of fluid under pressure to said usual chamber in inverse proportion to the degree of loading by a novel relay valve device sensitive to changes in load, and arranged to be returned to rest position by the usual return spring. The brake cylinder device is thus adapted to be so operated as to transmit to the brake rigging, at any particular condition of pressure of fluid in the usual pressure chamber, as governed by the AB valve, a force proportional to the load condition of the vehicle between limits of no load and full-load for varying the degree of braking accordingly.

It is one object of the invention to provide an improved fluid pressure brake cylinder device of the above type.

It is another object of the invention to provide a brake cylinder device of the above type with novel means for defining the compensating pressure chamber.

It is still another object of the invention to provide an improved brake cylinder device for use on railway vehicles which is relatively light in weight, cheap to manufacture, and reliable in operation.

Other objects and advantages will be apparent from the following more detailed description of the invention.

In the accompanying drawing, the single figure is a diagrammatic sectional view taken longitudinally through a brake cylinder device embodying the invention.

As shown in the drawing, the improved brake cylinder device comprises a hollow cylindrical casing 1 which may be cast of aluminum to reduce its weight to a minimum commensurate with strength, and which is closed at one end by a preferably integral pressure head 2. To the open end of the casing 1 is secured an annular pressure head 3 interposed between said casing and a cup-shaped non-pressure head 4 which are secured together by bolts (not shown). The heads 3 and 4 also are preferably formed of aluminum to reduce their weight. A brake cylinder piston assemblage 5 is slidably mounted in the casing 1, and at one side thereof is the usual or a main pressure chamber 6 to which is connected a pipe 7 by way of registering passages 8 extending through removable fittings 9 and 10 and centrally through the pressure head 2. The pipe 7 is adapted to be connected in turn to a fluid pressure control valve device (not shown), such as the well-known AB valve, to effect variations in pressure of fluid in the pressure chamber 6 for controlling and operating piston assemblage 5.

The piston assemblage 5 comprises a piston head 11 which may be formed of drawn steel to reduce to a minimum the amount of machine work necessary to form it. This head is provided with a circular flat central portion and an annular portion encircling the flat central portion which annular portion is in the form of a portion of a sphere. An annular peripheral groove 12 is machined in the head 11 for securing a resilient snap-on packing cup 13, disposed in the chamber 6, to one face of said head. The packing cup 13 is provided with an annular U-shaped portion 14, which portion is open to chamber 6 and which curves into slidable contact with the inner wall of the casing in such a manner that pressure of fluid in said chamber acts thereon to urge it into sealing engagement with said wall for preventing leakage of fluid under pressure past the piston head. An annular substantially U-shaped metal ring 15 is interposed between the portion 14 of the packing cup 13 and one face of a radially projecting annular flange 16 attached to the piston head 11. A portion of the ring 15 is curved to form a support for the back of portion 14 of cup 13. A lubricating swab 17, in the form of a felt or similar ring encased in an expander ring, is disposed within the ring 15 and thereby secured to move with the piston head 11 in slidable contact with the casing wall to distribute and store lubricant thereon for a considerable period of time. The outer peripheral edge of the flange 16 attached to the piston head 11 is machined to provide an accurate fit for slidable contact between said head and the casing wall.

A hollow cylindrical member 18, disposed on the opposite side of the piston head 11, is secured adjacent its one end to said head for movement therewith by an annular baffle member 19, and is slidably guided at its opposite end by a sleeve member 20 disposed in and secured to the non-pressure head 4. The annular baffle member 19 is secured at its outer periphery by a continuous weld 21, or other suitable means, to a face of the flange 16 of the piston head 11, and the member 18, which projects through the member 19, is secured to the inner peripheral edge of said member 19 by means of a similar continuous weld 22, or the like. The member 19 for the major portion of its width is dished in the direction toward the piston head 11 for the purpose of imparting rigidity to said member.

An annular compensating pressure chamber 23 is defined by the outer cylindrical surface of member 18 and the inner surface of casing 1 between the annular baffle member 19 and the annular pressure head 3. The chamber 23 is connected to a pipe 24 by way of registering passages 25 in the pressure head 3, the non-pressure head 4 and a removable fitting 26. The pipe 24 is adapted to be connected to a novel relay valve device (not shown), described in the aforementioned patent, for effecting variations in the pressure of fluid in the chamber 23 in accordance with the degree of loading on the vehicle. Pressure of fluid in the chamber 23 acts on the annular area of the baffle member 19, secured to the piston head 11, in opposition to the force of said head caused by the pressure of fluid in the usual pressure chamber 6, and since the pressure in said chamber 23 is varied in the manner as above described, the effective force delivered by said head for applying the brakes varies in accordance with the degree of loading. The welds 21 and 22 acting to secure member 18 to member 19, and member 19 to piston head 11 serve also to form a seal for preventing fluid under pressure from escaping from the compensating pressure chamber 23 past the baffle member 19. A resilient annular sealing ring 27 is disposed in a groove in the pressure head 3 for slidable engagement with the outer surface of member 18 to prevent leakage of fluid under pressure from chamber 23 past said head.

The sleeve member 20 is provided at one end with an outwardly projecting annular flange 28 which is disposed coaxially with relation to the member 18 in a central counter-bore 29 in the non-pressure head 4. This counter-bore provides a shoulder 30 against which the flange 28 rests. An annular ring member 31 is pressed into the counter-bore 29, which member abuts the flange 28, holding said flange rigidly seated against the shoulder 30, thereby removably securing the sleeve member 20 to the head 4. A lubricating swab 32 in the form of an annular felt ring is mounted in a groove in member 31 for slidable engagement with the outer surface of the member 18.

The sealing ring 27 is provided with an outer flat edge portion which is clamped between the heads 3 and 4 to allow for easy removal and insertion and an inner edge portion 33 is made U-shaped in cross section, similar to portion 14 of cup 13. The portion 33 opens in the direction of the chamber 23 so that action of pressure of fluid therein urges the ring 27 into sealing engagement with the member 18.

The interior of the hollow cylindrical sleeve member 18 forms a non-pressure chamber 34 which opens into the interior of the non-pressure head 4. The non-pressure chamber 34 is constantly open to atmosphere through a breather port 35 in head 4 covered by an air strainer 36 of curled hair or the like. The strainer 36 is disposed in an open cup-shaped retainer 37 secured to the head 4 and encircling the port 35. The port 35 is provided to permit free passage of air into and out of the non-pressure chamber 34 upon reciprocation of the piston head 11 in the casing 1, while the strainer over said port is adapted to prevent dust and dirt from entering said chamber. The strainer 36 is preferably mounted at the lower side of the non-pressure head 4 in order to avoid, insofar as possible, free entrance of dirt and moisture to said strainer.

A base member 38 is disposed within the non-pressure chamber 34 adjacent to the piston head 11. A hollow piston rod 39, of the usual type, is secured at its one end by means of rivets to a boss 40 attached to the member 38. The opposite end of the rod 39 extends through and is slidably guided within a tapered opening 41 in an end wall 42 in the non-pressure head 4. A push rod 43 projects into the rod 39 in the usual manner and abuts a steel insert 44 carried by the aluminum base member 38.

The base member 38 is arranged to move with the piston head 11 for transmitting thrust to the push rod 43, and thence to the brake rigging for applying the brakes (not shown). Clearance is provided between the outer periphery of the base member 38 and the inner wall of the member 18 so that as said base moves with the piston head 11 it is free to adjust itself in a radial direction to correct for any initial misalignment with the piston 11 and the member 18 and thereby prevent binding. The tapered opening 41 in the wall 42 allows the piston rod 39 attached to the base member 38 the necessary freedom for such adjustment.

The face of the base member 38 is provided with an annular curved surface 45, which may be in the shape of a portion of a sphere, for slidable engagement with the corresponding curved surface of the piston head 11. The central portion of the member 38 encircled by the annular curved surface 45 is provided with a cavity 46 of larger diameter than the diameter of the central flat portion of the piston head 11 so that the surface 45 is allowed freedom for travel on said head 11 to provide for the previously described radial adjustment.

A retaining member 47 in the form of a thin hollow cylinder is spot-welded to the inner wall of the cylindrical member 18. The member 47 is provided with a plurality of spaced-apart thin yieldable fingers 48 which are defined by longitudinally extending slots cut in the member 47. The fingers 48 are bent into engagement with the member 38 and act to hold said member and piston head 11 together during removal of the casing 1 from the non-pressure head 4. For example, if inspection of the packing cup 13 is desired, the casing 1 is unbolted from the non-pressure head 4 and said casing is slipped off over the piston assemblage 5 to expose said packing cup. A retaining ring 49 in the usual form, secured to the outer end of piston rod 39 prevents the member 38 from moving in the direction of the left-hand, as viewed in the drawing, and the retainer member 47 comprising the fingers 48 anchors the member 19 and attached piston head 11 to said base member 38 to prevent them from moving with the casing.

The fingers 48 are flexible so that, whereas they are of sufficient strength to serve to anchor the piston head 11 to the base member 38, they yield to allow said base to move radially during the previously described aligning adjustment. One end of a compression return spring 50 seats on the flexible fingers 48, urging said fingers into contact with the member 38 and, in turn, urging said member into contact with the piston head 11, so that once said member has moved to an adjusted position with respect to said piston head it will be held in the adjusted position by friction and the yieldable clamping action of the spring and fingers, it being understood that the structure is at all times automatically adjustable to prevent any bending action on the movable parts of the piston assemblage.

The compression return spring 50 is provided to serve the usual purpose of returning the piston assemblage 5 to its normal brake released position, as shown in the drawing, in effecting the release of a brake application. The spring 50 is disposed in the non-pressure chamber 34 encircling the piston rod 39 and is tapered to prevent it from cocking as it is further compressed during travel of the piston assemblage 5. The opposite end of the spring 50 seats on an annular seat flange 51 attached to a sleeve 52 which is slidably mounted on the piston rod 39. An annular V-shaped resilient porous filter member 53 encircles the rod 39 and is interposed between a beveled face of the flange 51 and a beveled shoulder 54 formed in the end wall 42 encircling the tapered opening 41 in the non-pressure head 4. The filter member 53 is squeezed, by action of the spring 50, between the flange 51 and shoulder 54 into contact with the outer surface of the piston rod 39 and with the portion of wall 42 encircling the opening 41 so that any air entering through said opening which may be carrying dust or dirt must pass through the member 53 and thereby be filtered or cleaned.

The brake cylinder device is provided with a pressure indicator 55 which indicates at all times whether or not there is fluid under pressure present in the compensating pressure chamber 23 for thereby enabling an inspector of the brake equipment, at any time, to determine visually whether or not the brake equipment is adjusted for an empty or loaded car.

The pressure indicator 55 comprises a hollow cylindrical casing 56 disposed outside the non-pressure head 4 and having screw-threaded attachment therewith to allow for easy removal. One end of the casing 56 is closed by an end wall 57 formed in the non-pressure head 4, while the opposite end is closed by a cap 58 which is suitably secured to the casing. A piston 59 is slidably mounted in the casing 56, serving to define a pressure chamber 60 at one side thereof which is constantly open to the compensating pressure chamber 23 by way of registering passages 61 extending through the annular pressure head 3 and a portion of the non-pressure head 4. The piston 59 serves to define a non-pressure chamber 62 at its opposite side. A resilient piston cup 63 is disposed in chamber 60 which has a snap-on attachment with a central button carried by piston 59. The cup 63 slidably engages the inner wall of casing 56 for preventing leakage of fluid under pressure past the piston. An indicator rod 64 is attached to the piston 59 which extends through the chamber 62 and projects through a central opening in the cap 58. There is clearance provided between the rod 64 and cap 58 to act as a breather port for the chamber 62 which is thereby open to atmosphere. A compression spring 65, with little or no precompression, is disposed in the chamber 62 and is interposed between the piston 59 and a spring seat in the form of an annular washer member 67, which encircles the rod 64. Interposed between the member 67 and the cap 58 there is an annular resilient porous ring 67 which is arranged to contact with the rod 64 and with the cap 58 to filter air passing through the opening in said wall which acts to prevent dust and dirt from entering the chamber 62. The porous ring 67 also acts as a buffer for the piston 59 when a shoulder 68 on said piston moves into engagement with washer member 66. A washer member 69 is disposed in a groove adjacent to the outer projecting end of the rod 62. Member 69 is provided for defining a limit of travel for the piston 59 in the direction of the chamber 60, being arranged to seat on the outside of the cap 58.

It will be appreciated that when fluid under pressure is supplied to chamber 23 such pressure acting in chamber 60, will cause said piston to move against spring 65 to push rod 64 out through the cap 58. When there is no fluid under pressure in chambers 23 and 60 the rod 64 will be drawn into the casing 56 by spring 65. By visual inspection, therefore, it is possible, by observing the position of rod 64 to determine whether or not fluid under pressure is present in chamber 23, and hence whether the brake equipment is properly conditioned for respectively, an empty or loaded car.

The improved brake cylinder device is further provided with a slack-adjuster control valve device 70 which comprises a casing 71 mounted on the non-pressure head 4 and covering a relatively large opening 72 in said head which opens into the non-pressure chamber 34. The casing 71 is provided with a fluid pressure supply passage 73 connected to a fluid pressure pipe 74, which pipe is in turn connected to the passage 8 in the fitting 10 secured to end wall 2 of the casing 1 to thereby act as a communication for supply of fluid under pressure to said supply passage 73. The casing 71 is also provided with a fluid pressure delivery passage 75 which is adapted by means of a fitting 76 to be connected to a pipe 77 for connection with a fluid pressure actuated slack adjuster device (not shown) of the usual fluid pressure controlled type. A bore 78 is formed in casing 71 which extends between respective ends of passages 73 and 75. A valve seat bushing 79 is provided which has a press fit with the bore 78. The bushing is provided with a through bore 80 extending longitudinally therethrough between a delivery chamber 81, formed in said bore, and the non-pressure chamber 34 in the head 4. The chamber 81 is closed at its one end by a removable cap 82 secured by screw threads to casing 71. A supply valve 83 is disposed in delivery chamber 81 and is attached to a sleeve member 84 which is slidably mounted in the bore 80. A compression spring 85 is arranged to urge the valve 83 to a normally closed position seated on an annular shoulder formed in the seat bushing 79 encircling the end of bore 80. An annular groove is formed in the outer periphery of the bushing 79, which groove registers with the end of the supply passage 73 and is constantly open to ports 86 connected to an annular chamber within the bore 80. The annular chamber is formed by a groove in the member 84, so that fluid under pressure from the passage 73 will flow to the delivery chamber 81, thence to the passage 75 and the pipe 77 when the valve 83 is unseated. A central bore extends through both the valve 83 and the sleeve 84 between the delivery chamber 81 and the chamber 34 in the head 4. A release valve 87, attached to a fluted stem slidably mounted in the bushing 84, is disposed in the chamber 34 for opening and closing the delivery chamber 81 to the chamber 34 via the bore in the sleeve 84 to control release of fluid under pressure from the pipe 77. An actuating arm 88 is pivotally attached to the casing 71 for actuating the valves 83 and 87. A compression return spring 89 is arranged to bias the arm 88 away from the valve 87 with which valve said arm remains in contact. A shoulder 90 is formed in the casing 71 against which the arm 88 abuts to define a normal rest position projecting into the chamber 34 and into the path of travel of the hollow cylindrical member 18. The arm 88 is so located that overtravel of the piston assemblage 5, caused by overtravel of the brake rigging due to wear of the brake shoes, permits the member 18 to move into engagement with the arm 88 and thereby displaces the arm, in opposition of action of the spring 89, to first seat the release valve 87 on the sleeve 84 and, by movement of said sleeve, to unseat the supply valve 83 to supply fluid under pressure to the pipe 77 for actuating the slack adjuster. During the release of the brakes, as the piston assemblage 5 including the member 18 return to rest positions, as shown in the drawings, said member 18 moves away from the arm 88 and allows the springs 85 and 89 to return the slack adjuster valve device 78 to the position in which it is shown in the drawing, with the supply valve 83 closed and the release valve 87 open, to vent fluid under pressure from the slack adjuster device by way of the chamber 34 in the non-pressure head 4. The fluid pressure actuated slack adjuster device operates in the well-known manner in response to pressure of fluid supplied to it by adjusting the brake rigging to maintain travel of the brake cylinder piston substantially constant to compensate for the effect of brake shoe wear which tends to increase said travel.

Since the welds 21 and 22 serve to secure the baffle member 19 to the piston head 11 and the cylindrical member 18 to said baffle, as well as serve to seal off the compensating pressure chamber 23 encircling the member 18 from the non-pressure chamber within said member 18, said welds may be pressure tested to prove their sealing qualities. It will be appreciated that means other than welding, such as brazing or soldering might be employed to serve the same purpose.

The sealing ring 27 cooperating with the outer wall of cylindrical member 18 is protected from excessive wear due to abrasive action of dust and dirt by virtue of its location within the brake cylinder device into which no dust laden air is allowed to flow, either directly or indirectly. The ring 27 is further protected from excessive wear by virtue of its cooperation with the member 18, which remains entirely enclosed within the casing of the brake cylinder device at all times and is not subjected to corrosive action of the elements, consequently the member 18 presents clean smooth surface for slidable sealing contact with said ring.

While only one illustrative embodiment of the invention has been shown and described in detail, it is not my intention to limit its scope to that embodiment or otherwise than by the terms of the appended claims.

Having now described my invention, what I claim as new and desire to secure by Letters Patent, is:

1. A brake cylinder device comprising a hollow cylindrical casing, a pressure head closing one end of said casing, a non-pressure head secured to the opposite end of said casing and having an opening connecting the interior of said casing to atmosphere, said opening being in coaxial relation to said casing and being tapered with the smaller end at the inner wall of said non-pressure head, a piston head slidably mounted in said casing and cooperative with said pressure head to form in said casing a fluid pressure chamber at one side of said piston and cooperative with said non-pressure head to form a non-pressure chamber at the opposite side, a piston rod disposed in said non-pressure chamber and projecting through said opening in said non-pressure head, the end of said rod disposed in said non-pressure chamber being capable of sliding on said piston head radially thereof, and means for urging said end of said piston rod into abutment with said piston head for movement thereby.

2. In combination, a brake cylinder casing comprising a hollow cylindrical portion having an open and a closed end and a hollow frustrated conical portion having a closed end and an open end clamped to the open end of said cylindrical portion coaxially therewith, said hollow frustrated conical portion having a cylindrical enlargement at its open end terminating at an annular flat shoulder, a sleeve guide member having one end projecting with clearance into said conical portion and having a radially extending annular flange of outer diameter substantially equal to that of said enlargement, said flange being in abutting relationship with said shoulder, a retaining ring held by press fit in said enlargement to maintain said abutting relationship, annular pressure head means interposed between said hollow cylindrical portion and said hollow frustrated conical portion, a piston head slidably mounted in said hollow cylindrical portion, and a tubular member attached at one end to said piston head coaxially therewith and extending in slidable sealing engagement through said annular pressure head means into slidable guiding engagement with said sleeve guide member.

ARTHUR J. BENT.

REFERENCES CITED

The following references are of record in the file of this patent:

UNITED STATES PATENTS

| Number | Name | Date |
|---|---|---|
| 243,450 | Lafargue | June 28, 1881 |
| 747,772 | Rickman | Dec. 22, 1903 |
| 772,842 | Spencer et al. | Oct. 18, 1904 |
| 1,413,645 | Wiltse | Apr. 25, 1922 |
| 1,449,947 | Kiesel | Mar. 27, 1923 |
| 1,504,006 | Weaver | Aug. 5, 1924 |
| 1,745,346 | Anderson | Feb. 4, 1930 |
| 1,789,593 | Murphy | Jan. 20, 1931 |
| 1,935,809 | McCune | Nov. 21, 1933 |
| 1,996,826 | Ohmart | Apr. 9, 1935 |
| 2,165,985 | Schwentler | July 11, 1939 |
| 2,326,825 | Bucknam | Aug. 17, 1943 |
| 2,428,117 | Kanuch | Sept. 30, 1947 |

FOREIGN PATENTS

| Number | Country | Date |
|---|---|---|
| 274,166 | Great Britain | July 7, 1927 |